(12) United States Patent
Ling et al.

(10) Patent No.: US 12,705,553 B1
(45) Date of Patent: Aug. 11, 2026

(54) SYSTEMS AND METHODS FOR PROCESSING GLOBAL REGULATORY SUBMISSIONS

(71) Applicant: Veeva Systems Inc., Pleasanton, CA (US)

(72) Inventors: Cindy Ling, Jersey City, NJ (US); Richard Merrick, Dresher, PA (US); Rolando Sa, Lebanon, NJ (US)

(73) Assignee: Veeva Systems Inc., Pleasanton, CA (US)

( * ) Notice: Subject to any disclaimer, the term of this patent is extended or adjusted under 35 U.S.C. 154(b) by 46 days.

(21) Appl. No.: 18/638,920

(22) Filed: Apr. 18, 2024

(51) Int. Cl.
*G06Q 10/0631* (2023.01)
*G06Q 10/10* (2023.01)

(52) U.S. Cl.
CPC ......... *G06Q 10/0631* (2013.01); *G06Q 10/10* (2013.01)

(58) Field of Classification Search
CPC ........................... G06Q 10/0631; G06Q 10/10
See application file for complete search history.

(56) References Cited

U.S. PATENT DOCUMENTS 11,030,232 B1 * 6/2021 Reich ...................... G06F 16/38
11,604,840 B1 * 3/2023 Sa .......................... G16H 15/00
2020/0175110 A1 * 6/2020 Snyder ................... G06Q 10/10
2024/0098115 A1 * 3/2024 Dürr ................... H04L 67/1006
2024/0289746 A1 * 8/2024 Goldsmith ........... G06Q 10/101

OTHER PUBLICATIONS

C. Mehmet Ulema, “Fundamentals of Public Safety Networks and Critical Communications Systems: Technologies, Deployment, and Management”, Wiley-IEEE Press 2018 (Edition: 1, pp. 320), 2018 (Year: 2018).*

* cited by examiner

*Primary Examiner* — Amber A Misiaszek

(57) ABSTRACT

Systems and methods for optimized processing of global regulatory submissions to health authorities. A content management system provides an end-to-end solution for submitting regulatory documents, from authoring through uploading to a health authority gateway. The content management system creates, manages and consigns submission content plans for a regulatory event requiring regulatory approval based on a global content plan. The content plans may be generated based on content plan templates which may take into account submission information and can be dispatched separately by sections, components, or groupings. The global and local submission plans are collated to generate a comparison. A comparison viewer user interface displays the side by side hierarchical comparison of global with submission content plan where each row is a content plan item with differences highlighted.

19 Claims, 9 Drawing Sheets

600

SYSTEMS AND METHODS FOR PROCESSING GLOBAL REGULATORY SUBMISSIONS

TECHNICAL FIELD

The present disclosure relates generally to content management systems, and more particularly to processing regulatory submissions to health authorities.

BACKGROUND

Regulatory information management (RIM) has become a major focus among pharmaceutical companies, since it is important to meet their regulatory and compliance obligations, and improve their business processes and productivity across the globe. For a pharmaceutical company, the regulatory information may include, e.g., safety reporting, product registrations, central and local requirements, submissions to health authorities, and health authority information management.

Most global enterprise customers distribute global submission content to regional/local affiliates from a core dossier. However, while affiliates are responsible for completing the administrative documents in addition to assembling and submitting the submission to the local health agency, they do not have the knowledge of which core documents (e.g., quality, clinical, nonclinical, labeling, etc.) should be included. The central functional teams have the responsibility to provide this information. There is a need to provide an automated system and method for completing the repetitive work of preparing local submissions more efficiently. Similarly, because many activities across various markets happen in parallel, there is a need to track updates to core documents after dispatch and visualize differences between the core content and local submissions more effectively.

SUMMARY OF THE INVENTION

Embodiments disclosed in the present document provide machine-implemented method for processing global regulatory submissions in a content management system, wherein the content management system comprises a content management server and a plurality of repositories. The computer-implemented method comprising: creating a first content plan for regulatory submission for a regulatory event, wherein the first content plan includes a first and second submission document required for regulatory approval; consigning at least the first submission document to a first affiliate for completion for regulatory submission; consigning at least the second submission document to a second affiliate for completion for regulatory submission; creating a second content plan for regulatory submission, wherein the second content plan includes the consigned at least first submission document required for regulatory approval; creating a third content plan for regulatory submission, wherein the third content plan includes the consigned at least second submission document required for regulatory approval; collating the first content plan and the second content plan to generate a comparison between each corresponding content plan item in the first and second content plan; generating a comparison viewer user interface displaying a hierarchical representation of the comparison between the first content plan and the second content plan, wherein new, updated and removed documents are designated; receiving input from the comparison viewer user interface confirming approval of selected content plan items in the second content plan; and storing each of the selected content plan items in the second content plan in a submission repository in the content management system.

BRIEF DESCRIPTION OF THE DRAWINGS

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

Figure 1:
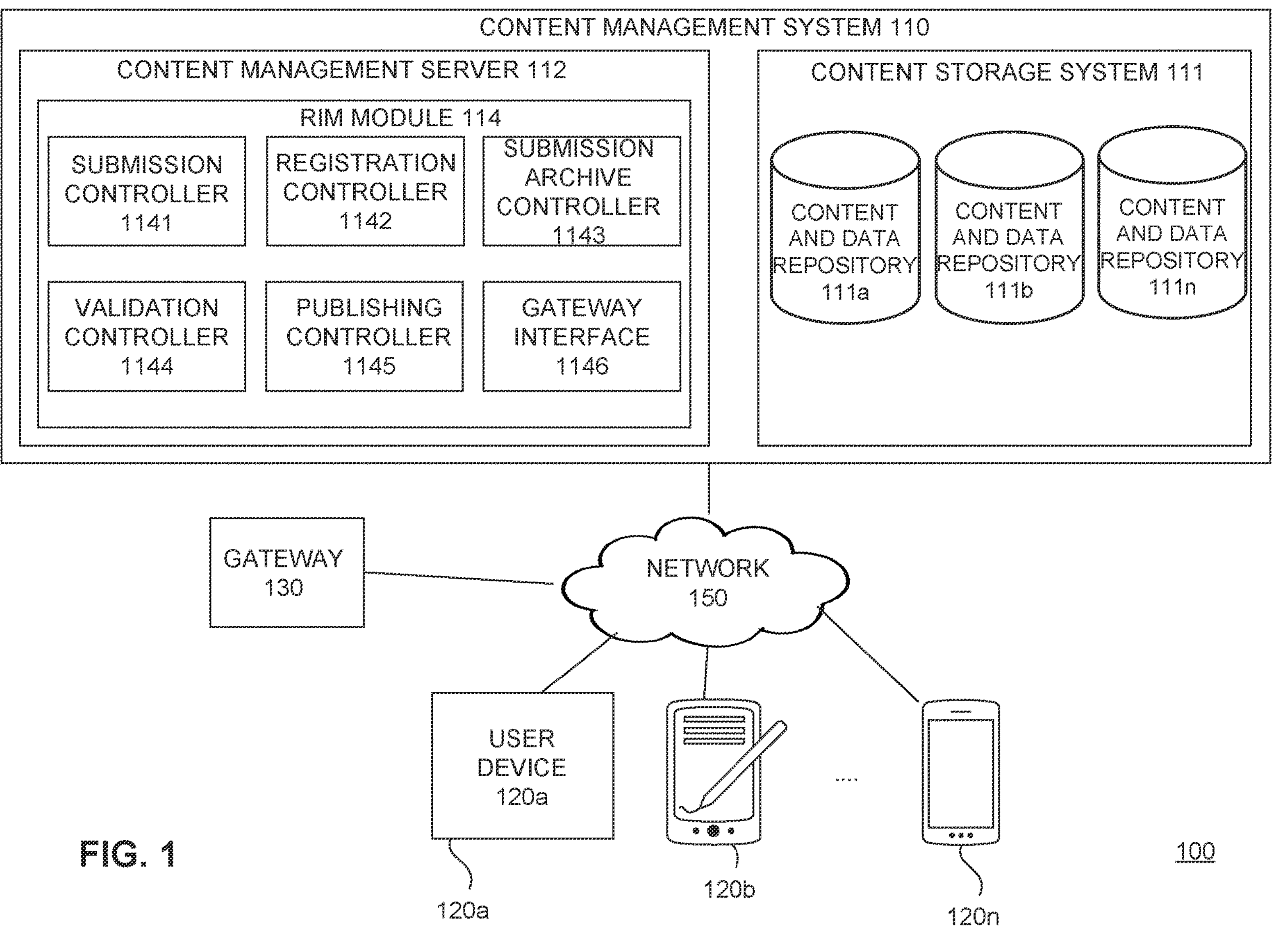
FIG. 1 illustrates an exemplary architecture for a regulatory information management system wherein the present invention may be implemented.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Embodiments disclosed in the present invention allow for optimized processing of global regulatory submissions to health authorities by providing for a system and method for creation, management and consignment of submission content plans in content management systems. According to one aspect of the subject technology, a content management system provides an end-to-end solution for submitting regulatory documents, from authoring through uploading to a health authority gateway. The content plans may be generated based on content plan templates. Each content plan template may take into account submission information like country, region, submission type, involved product, and other regional requirements.

In disclosed embodiments, the submission content plans may be consigned separately by sections or groupings. The groupings may be based on activities, regions, countries, object types, or the like.

The content management system may perform a comparison of a source and target content plan. In one implementation, the source content plan may be a global content plan and the target content plan may be a submission content plan for a local affiliate. The content management system may provide a content plan comparison user interface to visualize the differences more effectively as well as providing additional insights.

According to another aspect of the subject technology, the content management system may include a translation layer to facilitate the comparison of two content plans with different content plan templates. The translation layer may support investigational applications (e.g., CTAs, INDs) and MedTech Applications, where there is no single common, or harmonized structure across all markets.

FIG. 1 is a system overview illustrating an embodiment of an enterprise content management architecture 100 wherein the present invention may be implemented. The enterprise may be a business, or an organization. As shown, the architecture 100 may include a content management system 110, and a plurality of user computing devices 120*a*, 120*b*, . . . , 120*n*, coupled to each other via a network 150. The content management system 110 may include a content storage system 111 and a content management server 112. The content storage system 111 may have one or more content and data repositories, e.g., 111*a*, 111*b*, . . . , 111*n*. The network 150 may include one or more types of communication networks, e.g., a local area network ("LAN"), a wide area network ("WAN"), an intra-network, an inter-network (e.g., the internet) a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content management server 112 is typically a remote computer system accessible over a remote or local network, such as the network 150. The content management server 112 may include a regulatory information management module 114. The regulatory information management module 114 may have a submission controller 1141, a registration controller 1142, a submission archive controller 1143, a validation controller 1144, a publishing controller 1145, and a gateway interface 1146, which will be described in detail with reference to FIG. 3.

The content storage system 111 may store content that user computing devices 120*a*-120*n* may access. Each content repository (e.g., 111*a*, 111*b*, or 111*n*) may store a specific category of content, and allow users to interact with its content in a specific business context.

In one implementation, the repository 111*a* may store a submissions library for regulatory content related to submissions, which may include information and submissible documents and data for the generation of submission structures, and the planning, authoring and collection of required documents. Within the submissions library, users may quickly find information they are looking for through search and filtering. The user may find drug documentation related to a product or a geographic region. The repository 111*a* may also store information about review and approval flow, status of documents and a filing, and dashboard reports, giving users the ability to manage the overall process. The repository 111*a* may also store various distinct submissions library for regulatory content related to distinct submissions (e.g., global, local, regional, or the like).

In one implementation, the repository 111*a* may also store regulatory information related to product registration, which may include product registration information and health authority interactions. The product registration information may include, e.g., the associated product information, application information, application date, registration details, key registration dates, marketing status, and marketing details. In one example, the user may see all the global registrations and their status in one report. The health authority interactions may include bidirectional interactions with health authorities globally, including correspondence, commitments and queries.

In one implementation, the repository 111*a* may also store information for a submission archive, which may include a customer's complete global history of regulatory submissions and correspondence.

In one implementation, the repository 111*a* may also store source documents for the regulatory information management system.

Although the various submissions libraries, regulatory information related to product registration, submission archive, and source documents for the regulatory information management system are shown to be stored in one repository, it should be understood that they might be stored in multiple repositories.

The gateway 130 may be a web portal of a health authority.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
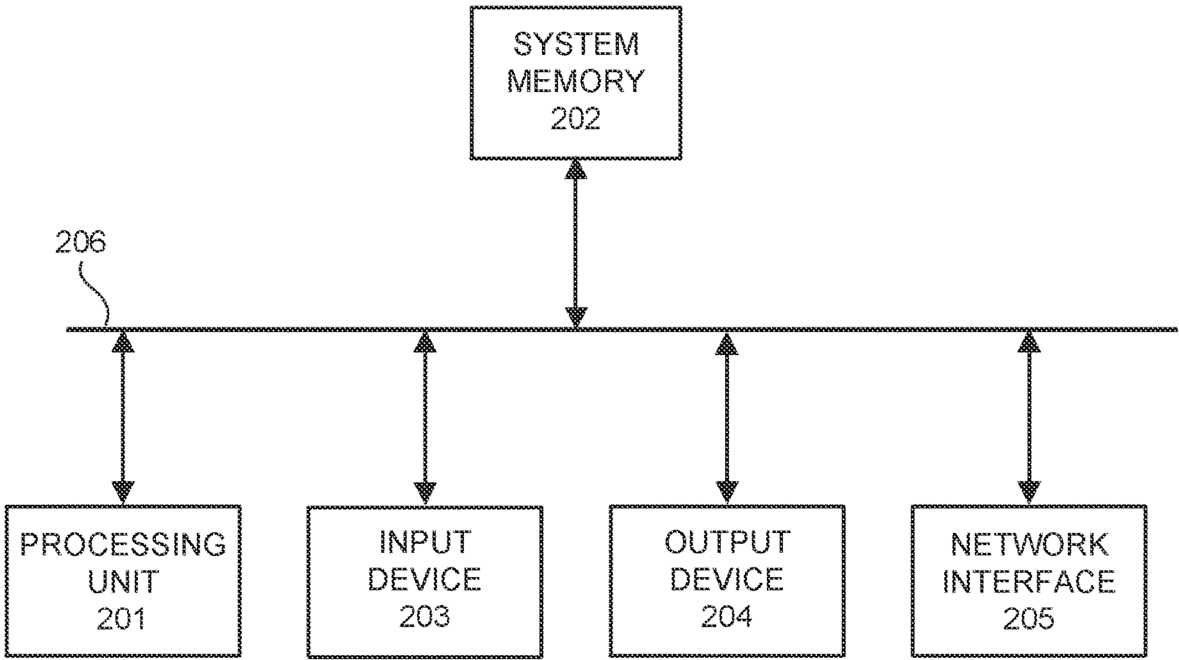
FIG. 2 illustrates an example high level diagram of a computing device according to one embodiment of the present invention.

FIG. 2 illustrates an example block diagram of a computing device 200 which can be used as the user computing devices 120*a*-120*n*, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
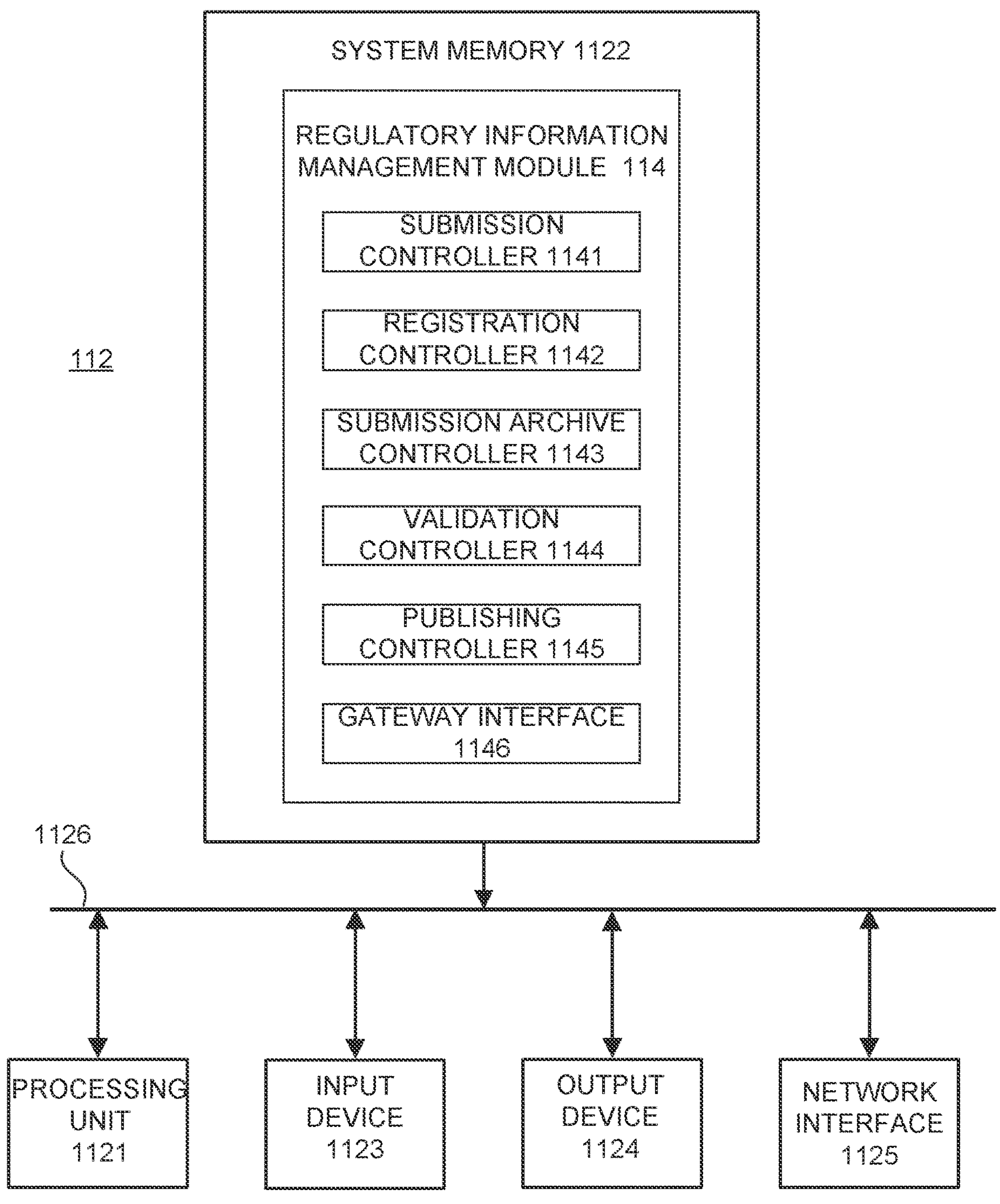
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The regulatory information management module 114 may be stored in the system memory 1122. The regulatory information management module 114 may have a submission controller 1141, a registration controller 1142, a submission archive controller 1143, a validation controller 1144, a publishing controller 1145 and a gateway interface 1146.

The submission controller 1141 may generate a submission user interface for the user to search the submission library. The user may find information they are looking for (e.g., a drug documentation related to a product) through searching via a search window, or filtering via filters. The user may also search for information specific to a geographic region, e.g., by selecting My Local View. The user interface may have a window for displaying documents based on the search result. In one implementation, submission is based on the drug information association ("DIA") reference model, and the reference model classification is built based on the latest DIA standards.

When the user clicks on a Task tab on the user interface, a task user interface may be displayed, and the user may work on his/her tasks, e.g., participating review and approval flow works.

The submission controller 1141 may also manage submission structures (e.g., a New Drug Application ("NDA") submission structure, or a Biological License Application ("BLA") submission structure). When the user clicks on the Submission Structure tab on the user interface, a submission structure interface may be displayed. One or more submission structures may be shown on the submission structure interface, e.g., an NDA.

If the user selects one of the submission structures, e.g., NDA, a user interface for that submission structure may be displayed, which may include the hierarchy of the documentation, e.g., Administrative Information, Common Technical Document Summaries, Quality, Nonclinical Study Reports, and Clinical Study Reports. The submission structure may serve as materials for the submission. The submission structure may include placeholder documentation for expected documents, and link documents from repositories in the content storage system 111 directly into the submission structure. In one example, the user may want to add a clinical overview from the existing set of documentation. He may search for it in the content storage system 111 and drag it to the submission structure. The user may also add a link or reference of content from other repositories directly into the structure.

The submission controller 1141 may generate the submission structures based on various templates. In one implementation, the template may be an electronic common technical document ("eCTD"), non-eCTD, another version of an existing eCTD, a country specific submission template (e.g, International Medical Device Regulators Forum (IMDRF), US electronic Submission Template And Resource (eSTAR)), a country specific investigational template (e.g., EU Currency Transaction Reporting ("CTR") or UK Corporate Transparency Act (CTA)), or the like. In another implementation, the template may be a mix of any of the above templates.

Figure 4:
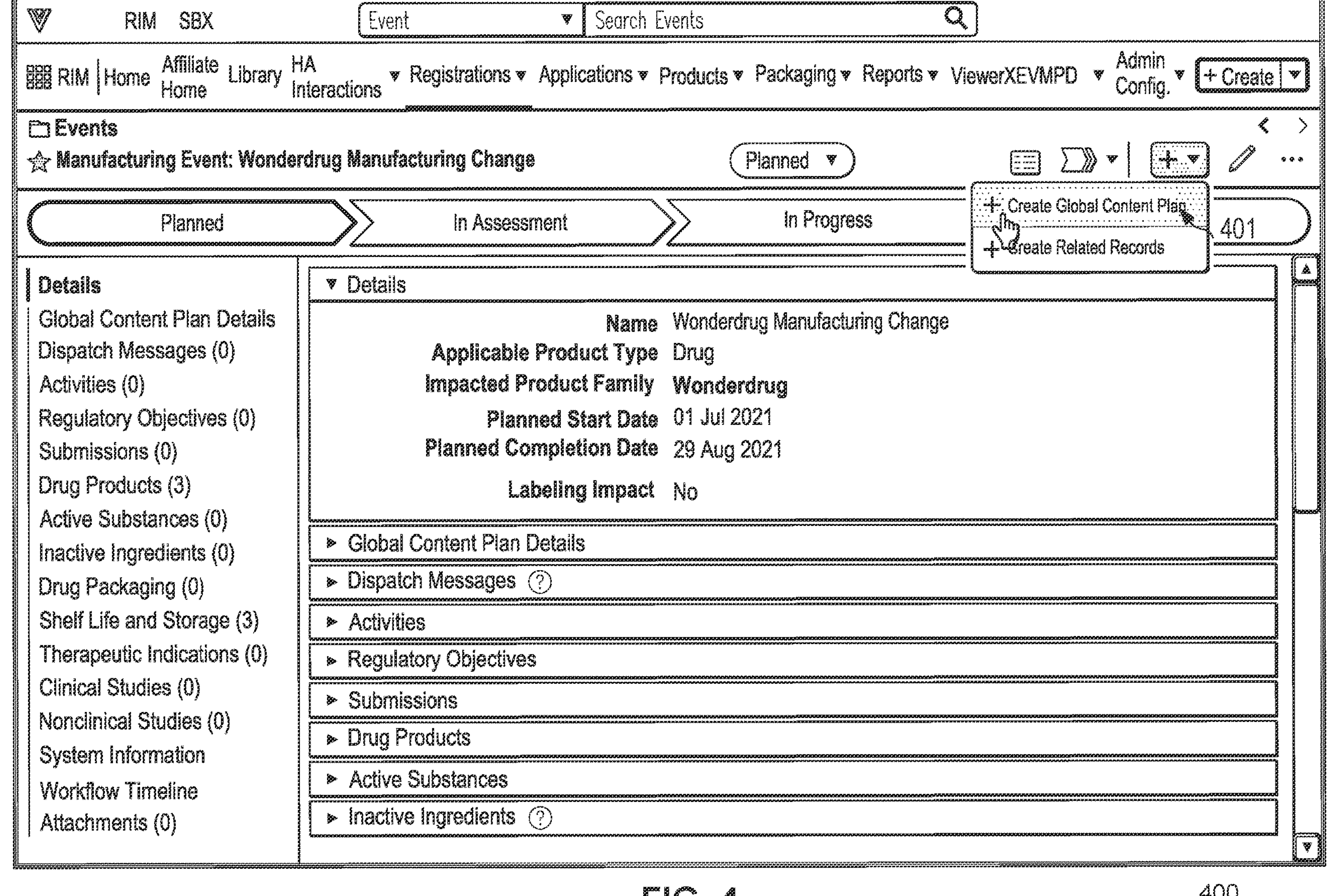
FIG. 4 illustrates an exemplary regulatory event user interface according to one embodiment of the present invention.

FIG. 4 depicts an exemplary regulatory event user interface 400 where the submission structures may be accessed. In one implementation, a global content plan may be created by selecting the Create Global Content Plan button 401. When selecting 401, the submission controller 1141 may generate another window to determine a submission application and a content plan template to use for the Global Content Plan. The submission controller 1141 may copy each regulatory event relationship stored in the repository 111*a* to a global submission object.

Figure 5:
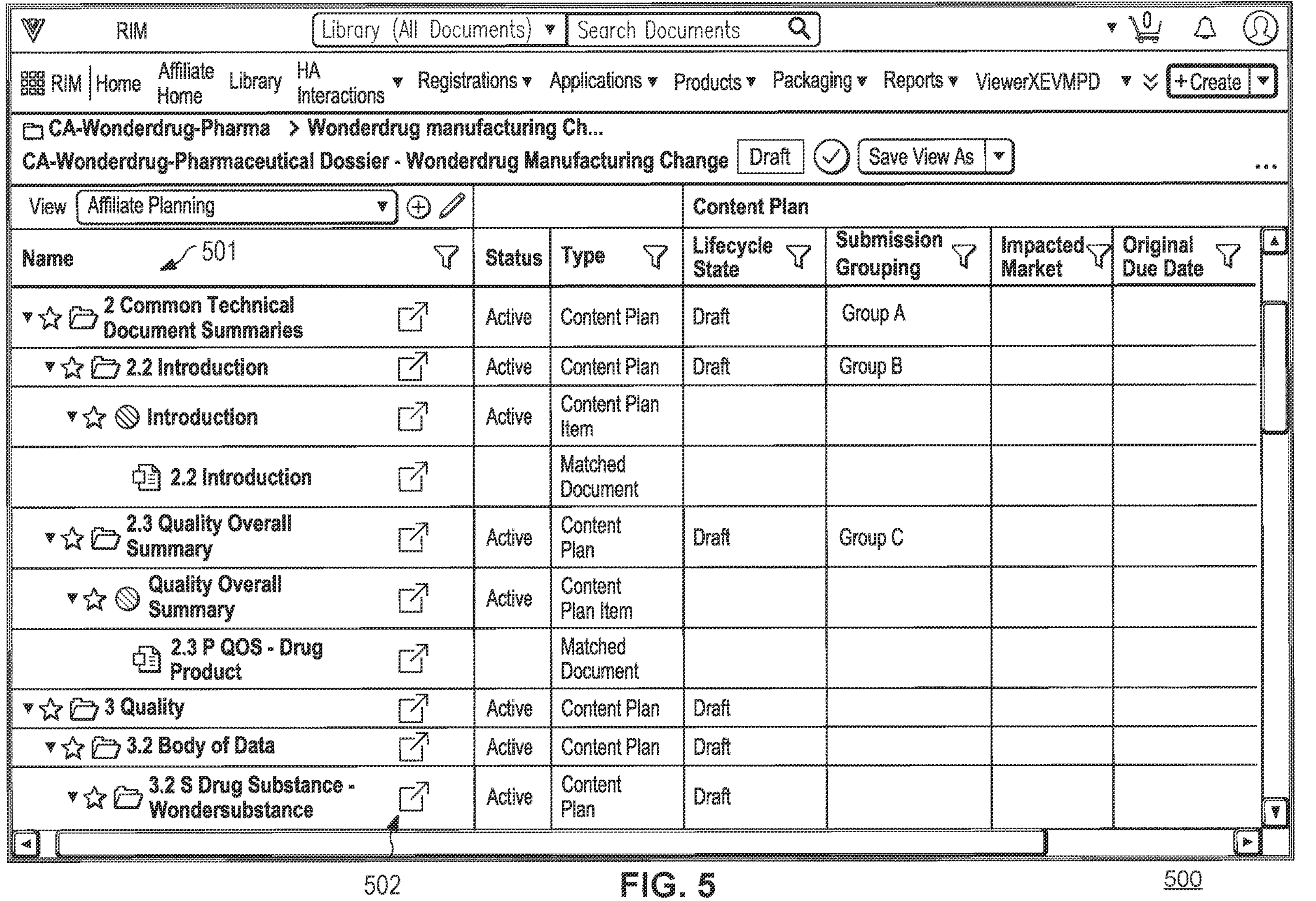
FIG. 5 illustrates an exemplary content plan user interface according to one embodiment of the present invention.

FIG. 5 depicts a content plan user interface 500 where submission structures may be managed. The content plan user interface 500 may display a listing of content plan, content plan item, or document 501 and corresponding fields including, but not limited to, status, type, lifecycle state, submission grouping, impacted market, original due date, planned due date, local disposition, description, section owner, notes, etc. Each content plan item may be opened in a built-in viewer by selecting 502. In one implementation, content plan, content plan item, or document 501 may be a word document, pdf file or any document included in a regulatory submission structure.

Figure 6:
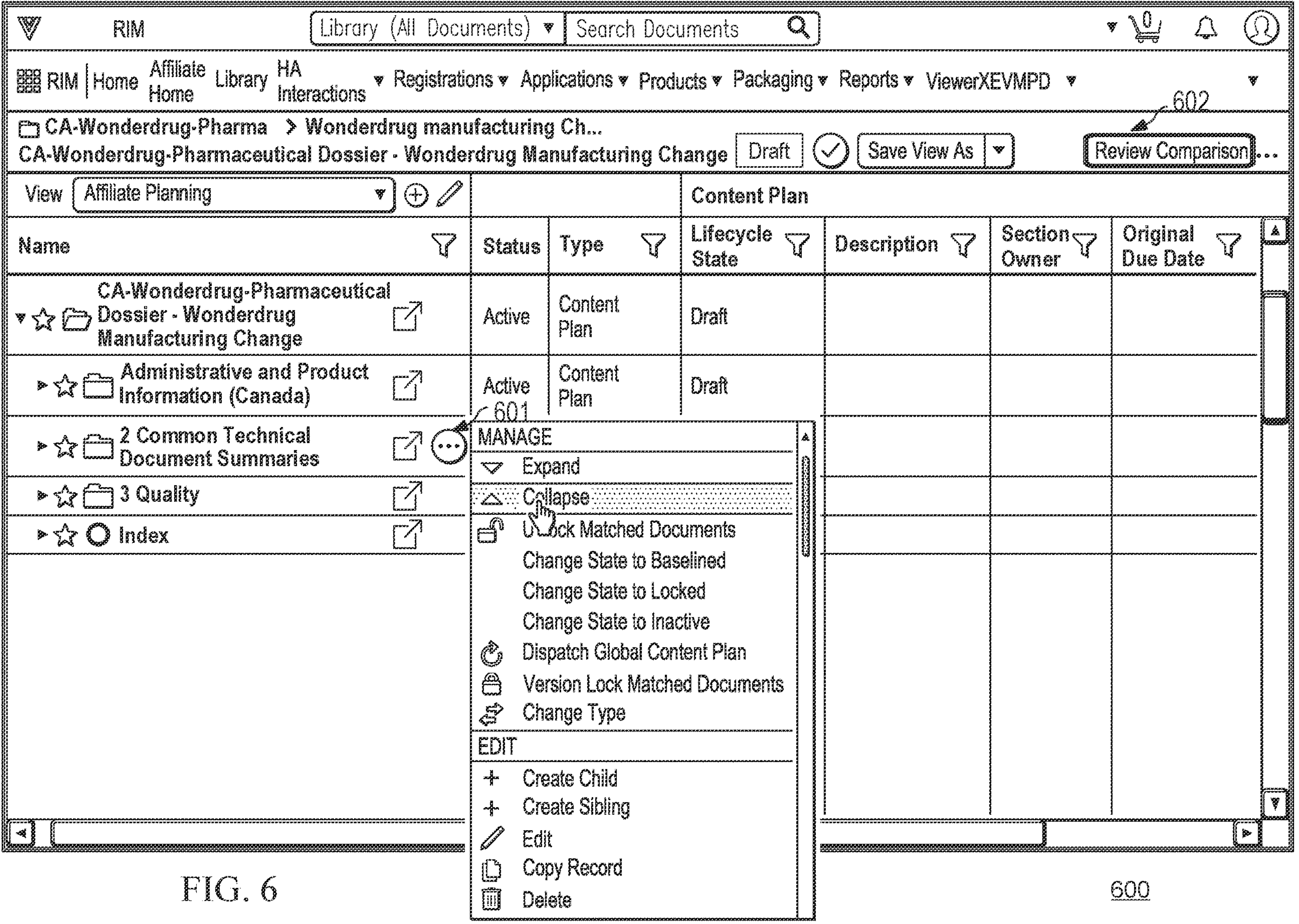
FIG. 6 illustrates another exemplary content plan user interface according to one embodiment of the present invention.

FIG. 6 depicts another content plan user interface 600 where submission structures may be managed. Selecting 601 may generate a pop-up menu with additional options for managing the submission structure. In one implementation, the submission controller 1141 dispatches the global content plan to create the submission content plan(s) asynchronously. When the dispatch process is complete, the Review Comparison 602 button appears on the user interface 600.

Figure 7:
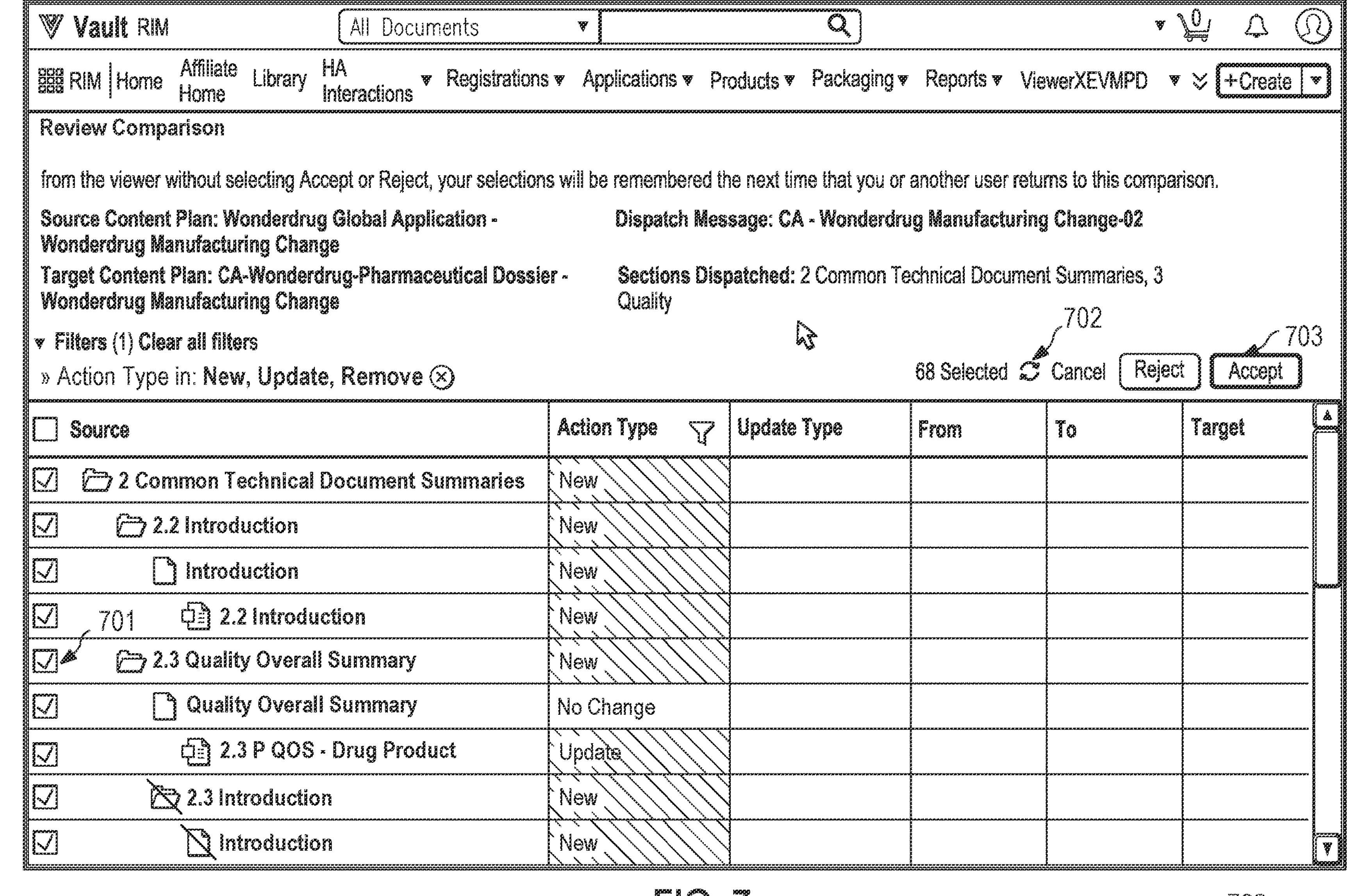
FIG. 7 illustrates an exemplary content plan comparison user interface according to one embodiment of the present invention.

Selecting Review Comparison 602 generates the content plan comparison user interface 700 depicted in FIG. 7. The submission controller 1141 generates a side by side hierarchical comparison of source with target content plan where each row is a content plan, content plan item, or matched document. In one implementation, the source content plan may be the global application and the target content plan may be the submission content plan for a specific region. The content plan comparison user interface 700 depicts indications of created or updated records as well as matched, updated, or removed documents. The indications may be color coded, shaded or visually differentiated to readily designate the correlation between source and target. Changes to the submission structure may be de-selected using 701 such that the corresponding modified content plan, content plan item, or document may be excluded from the submission content plan. The submission controller 1141 may regenerate the comparison via 702. Selecting 702 may synchronize the source and target content plans. When the Accept 703 is selected, the submission controller 1141 executes the changes and saves the selected content plan, content plan items, and matched documents into the submission content plan object in the repository 111*a*.

Through the process of structure assembly and management of content, the submission controller 1141 may also provide dashboard reports to give users the ability to manage the overall process through structure assembly and management of the content. The dashboard report may include current status of the NDA filing, in terms of documentation, a quick look of the status of the documents, each major module, as well as any workflows. From the dashboard, users may click into any of the wedges, and be taken to the report results. From the report results, users may take actions on the documents themselves.

Figure 8:
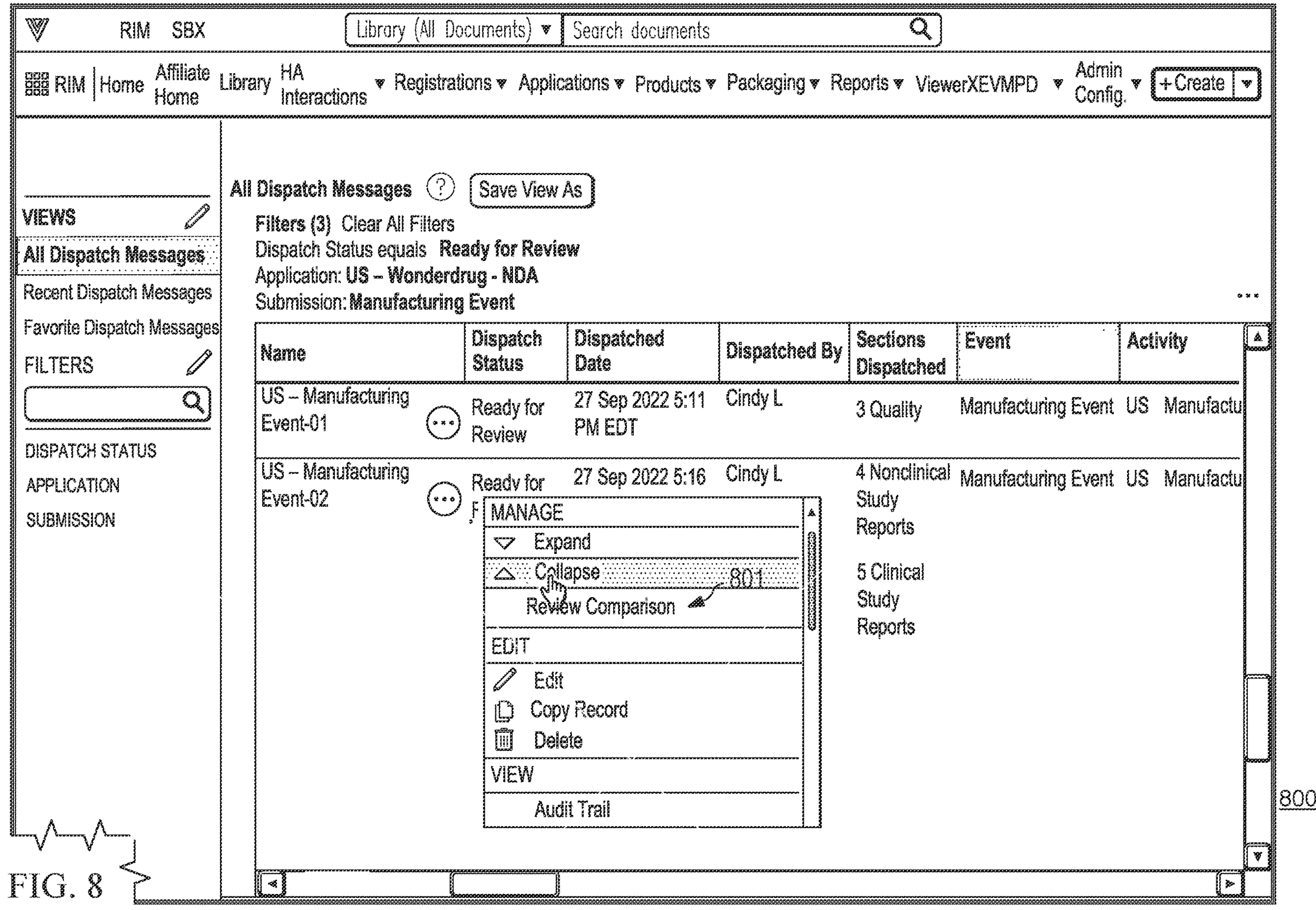
FIG. 8 illustrates an exemplary dispatch message record user interface according to one embodiment of the present invention.

FIG. 8 depicts a dispatch message record user interface 800 where dispatched sections per target submissions are tracked for each dispatch. In one implementation, the record created for each dispatch and target submission content plan may include global content plan, event, activity, country, submission, dispatched by, reviewed by, dispatch status, dispatch date, reason for rejection, number of excluded changes, sections dispatched, or the like. The content plan comparison user interface 700 depicted in FIG. 7 may be accessed via 801.

The submission controller 1141 may continuously monitor documents in the content storage system 111 for any changes that might affect publishing. The submission controller 1141 may also monitor the submission plan. The changes may be updated in real-time, eliminating the possibility of human error and ensuring faster time to submission.

The registration controller 1142 may provide a powerful tool for getting visibility to global registration information, and take actions on regulatory events. All tied seamlessly with various information and functions provided by the content management system 110. The registration controller 1142 may manage registration, product and application information to help customers to make informed decisions about their business. The registration controller 1142 may display registration, product and application information on a user interface. If a user wants to understand the global footprint of a product Coldcap, he may click on the Report button on the user interface. The user interface may be presented, displaying global registrations and their status in one report. The reports are actionable, allowing users to drill in a specific registration, e.g., the AU Coldcap registration. The registration record may provide key information including the register information, the associated product information, application date, and key registration dates. The registration record may be displayed on a separate user interface. Information in the registration record may be based on the IDMP data model. The registration controller 1142 may display a user interface for receiving product registration information and updates. The registration controller 1142 may further provide a comprehensive ability to not only capture and view regulatory data, but also take actions when an event occurs, including the ability to assess the impact of change, and manage global response to such change.

In addition to provide registration information, the registration controller 1142 may allow users to take actions on the regulatory business. Users may initiate an action through an event (e.g., update the Coldcap shelf life to 30 months), and assign activities to that event. The activities may be acted on by regulatory personnel that are responsible for a market. Activities may include submission responses. The user can also view the associated submission to address the activity.

Users may trace an actual submission binder representing the submissible content managed in submission library. User may also see key related content and data, such as correspondence and commitment made by the basis for the submission.

The registration controller 1142 may provide powerful, cloud based capabilities to manage product registration information and health authority interactions globally, and robust abilities to capture, view and take actions upon product registrations. It may track bidirectional interactions with health authorities globally, including correspondence, commitments and queries. With the related data features of the content management system 110, it may relate actions to be taken to product registrations. Since it is cloud based, it may tear down the virtual walls that often exist between centralized regulatory teams and their affiliates. Typically, the registration controller 1142 allows users at local sites to access and capture data related to their registration, while have visibilities into and collaborate with teams globally.

In one implementation, the registration controller 1142 is based upon the new Identification of Medicinal Products ("IDMP") data standard for product data, and can support an interface that allows regulatory groups to standardize their registration data, while also make it easy to interface with other software applications.

The registration controller 1142 may help to improve data quality, and make it easy to collaborate with global partners, affiliates and authorities, while reducing duplication and discrepancies by providing a single centralized depository for capturing and sharing regulatory data. The registration controller 1142 may also provide robust reporting and dashboard, and make it easy to report on, and visualize key data points, such as marketing status, registration details and marketing details.

The submission archive controller 1143 may provide a powerful, cloud based capability to access a complete history of regulatory submissions and correspondence globally, with an easy to use interface. From the upload and view perspective, the submission archive controller 1143 may provide electronic common technical document ("eCTD"), non-eCTD electronic, paper and PDF submissions. With the powerful search and filter capabilities of the content management system 110, the submission archive controller 1143 may make document and data search fast and easy. Upon import, all navigation within and outside of documents is rendered to be fully navigable in the content management system 110, making it easy to follow references. In addition, there is a built-in viewer. For eCTDs, it allows users to view submissions in a current view, sequentially, or as cumulative document views.

The submission archive controller 1143 works globally. Given that it is cloud based, it may provide a centralized archive for sharing global filings across the enterprise without requiring any additional software. In addition, with its powerful, easy to use searching and filtering capability, the submission archive makes it easy to find previously submitted information, in order to respond quickly to internal and external queries.

The submission archive controller 1143 may assist the process from submission planning to content authoring and publishing, by storing and viewing published output. The submission archive controller 1143 may display user interfaces for users to search and see the previously submitted information. Users can navigate to the viewer tab and select the application to view. Through the viewer, the user and navigate to published output, and get information on published facts. For a summary document, users can see published info from the backbone, and also historical context. Users can view the output the content management system 110, and use the native navigation of the document, including bookmarks and cross document hyperlinks.

In previous solutions, published output resides on uncontrolled file drives, disconnected from the source content. The submission archive controller 1143 addresses the need to securely map published output while providing global accessibility by storing the published output and allowing users to access the published output.

The validation controller 1144 may enable continuous and incremental validation of submission documents. Validation is a part of the publishing process. Every health authority has certain validation rules that the submissions need to be abide by. For example, values need to be in XML files, and fields need to be made available in a certain format. The validation controller 1144 may continuously validate submission documents and display validation results during the authoring process, so that users can correct errors during the authoring process, instead of waiting for the end of the authoring process.

The present invention provides a method for breaking up validation into smaller tasks as the submission is assembled and content becomes available. This may provide users with information about validation errors and warnings earlier in the process. On a submission record, users may set a corresponding regional version (e.g. DTD/XSD, schema files provided by a health authority and defining what the XML should conform to) and a validation criterion version applicable for the regional version. The validation criterion version is used to determine which rules are applicable for the corresponding submission. As new validation criteria become available, users can choose to adopt the new version or retain use of a prior version that is still accepted during an overlap period.

Structural validation rules may be verified as the content plan is created to become the structure within a submission archive in the content storage system 111 and as the XML files are created. Validation results may be captured at the XML document, element and attribute level. From the content plan and submission archive document and section, users may view the corresponding validation results.

File validation rules may be verified as the source content is published from the content plan item to become published documents within the submission archive. Validation results may be captured at the document, page, bookmark, link or link coordinates. From the content plan item and submission archive published documents, users may view the corresponding validation results and act.

Validation criteria may be stored in an object in the content management system 110 as system managed information to provide visibility to users while keeping the records managed to allow for updates as new validation criteria are issued and to allow administrators to inactivate validation criteria deemed to be not applicable. With the release of new validation criteria, the records may be provisioned to a repository in the content storage system 111 as inactive for users to activate when they are ready to do that. In one embodiment, validation criteria may be stored based on health authority, version and applicable DTD/XSD. In one embodiment, validation criterion version may be captured on each record and sourced from a controlled vocabulary object.

A Submission Validation Criterion object may be used to store each validation criterion as published by the health authority. This may contain a combination of system managed fields (e.g., Health Authority code) and user editable fields (e.g. Corrective Action). Each validation criterion may have version specific information and a relationship with the applicable geographic region, country and health authority.

A Submission Validation Result object may be used to capture details of the validation results with the relationship to the submission, content plan, content plan item, source document, published document and node within the submission archive in the content storage system 111.

In one embodiment, on a submission record, users may specify a regional DTD/XSD version and a corresponding validation criterion version. Only validation criterion that is active and corresponds with the reginal DTD/XSD version can be applied. Content Plan and Content Plan Item records may have the Continuous Validation field set to "Yes".

Continuous validation may be performed when the Continuous Validation field is set to "Yes", a Content Plan record is created or updated, a publishing job is initiated, or documents are published from the content plan.

On-demand validation may be performed from an action on submission, content plan or content plan item. For a submission, validation may be performed for the entire submission. For a Content Plan, validation may be performed for the section, descendants, content plan items and published documents. For a Content Plan item, validation may be performed for the specific content plan item and published documents.

Once validation is performed to compare structure and format of data with the validation criteria, the validation results may be stored in a validation result object depicting the completed validation and unresolved validation. The validation results may span the submission, Content Plan, Content Plan item and published output. Validation results may include a reference to the validation code, application, submission, Content Plan, Content Plan item and published file. When validation is successfully performed against a submission, content plan section, content plan item or published document, an entry may be created within the Validation Result object with a reference to the validated item, validation code and with a lifecycle state of "successful". When validation is unsuccessful for a submission, content plan section, content plan item or published document, an entry may be created within the Validation Result object with a reference to the validated item, validation code, failure detail and with a lifecycle state of "Unsuccessful". An example of an unsuccessful validation result is shown in FIG. 13. When an entry is no longer relevant because validation has been re-processed, the records may be set to a lifecycle state of "superseded" and a status of inactive.

When new validation criteria are supported in the content management system 110, the validation rules may be made available as new records, and the validation version may be made available.

Validation through the submission publishing process may allow users to verify the validity of a submission and reconcile results within a single system, e.g., the content management system 110. Customers may continuously and incrementally validate nodes based on changes as content is updated (e.g., when new documents are published), or on-demand as an action from the submission record.

The publishing controller 1145 may control continuous publishing of documents to the submission archive when they are authored. As parts of the submission are completed, they are continuously published for review, instead of being published only when the authoring process is completed. Users may correct errors timely during the authoring process, rather than waiting for the end of the authoring process. Consequently, the time between the user needs to do a submission and the actual submission may be minimized.

The gateway interface 1146 may enable submissions to be submitted directly to the health authority gateway 130.

In one implementation, the regulatory information management system may use the same data model for data objects for submission, product registration, submission archive, and source document management, and share data (e.g., product information and manufacturer information) among these functions, so as to avoid duplicate data entry, management and tracking. Health authorities define data requirements, and the regulatory information management system may provide information about the health authority data requirements. Customers may decide the data and documents to submit based on the information about the health authority data requirements, depending on the type of the submission.

Figure 9:
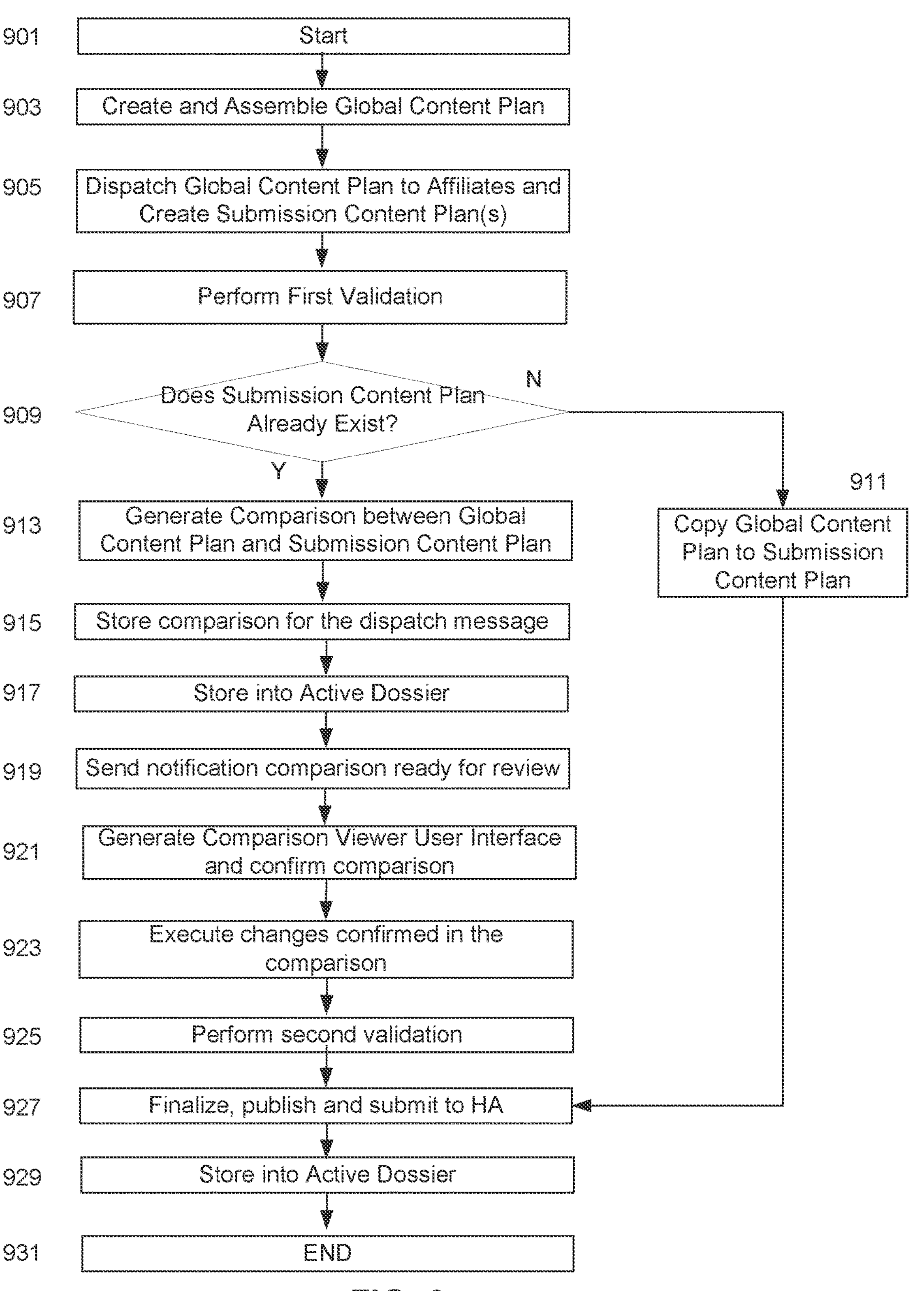
FIG. 9 illustrates an exemplary flow diagram of a method for processing global regulatory submissions according to one embodiment of the present invention.

FIG. 9 is a process overview illustrating an embodiment of the global content management system. The method begins at 901.

At 903, the global content plan may be created and assembled. In one implementation, the submission controller 1141 may create a global submission under the global application object and copy the event relationships to the global application and global submission. The global content plan may be created by selecting 401 in the regulatory event user interface 400 depicted in FIG. 4. Content plans, content plan items, and documents may be compiled and added to the global content plan by searching, dragging and dropping into the content plan user interface 500 depicted in FIG. 5.

In another implementation, the submission controller 1141 may create the global content plan based on content plan templates. Each content plan template may take into account submission information like country, region, submission type, involved product, and other regional requirements.

At 905, the submission controller 1141 may dispatch the global content plan to affiliates. A subsequent submission content plan may be created by the submission controller 1141. In one implementation, the submission controller 1141 may dispatch the global content plan in separate groupings. An example document variant may consist of the US, EU, Australia and Canada requiring document set A; South Africa, Jordan, and Thailand requiring document set B; and Brazil and Mexico requiring document set C. Based on different regulatory strategies, different submission content plans may be created based on different submission groupings. A flag may be set for repeat on submission grouping such that a content plan item may be included in each submission grouping. In another implementation, the submission controller 1141 may dispatch the global content plan all at once.

At 907, the submission controller 1141 may perform a first validation. In one implementation, the submission controller 1141 may validate the data model. For example, if the global application is not populated, there is nothing to dispatch. Similarly, the global content plan may be checked if it is within size requirements. A dispatch process is run asynchronously by the submission controller 1141. Another validation may be a determination whether a duplicate process is performed.

At 909, the submission controller 1141 performs determination whether the submission content plan already exists. When the submission content plan does not already exists, the process continues to 911.

At 911, the submission controller 1141 copies the global content plan to each active submission content plan for the selected submission grouping. In another implementation, a dispatch to all may copy the global content plan to all related submission content plans.

However, when the submission content plan already exists, the process continues to 913. At 913, the submission controller 1141 generates a comparison between a source content plan and a target content plan for the content plan sections dispatched. In one implementation, the source content plan may be the global content plan and the target content plan may be a submission content plan. Records and documents are identified using the source content plan template. When a record, or matched document is missing in the target content plan, the record/matched document receives an action type "New". If the record/matched document is found in the target, select fields are also compared and given an action type "Update". Any of fields may be configured for comparison. Some may include Name, Title, Expected Steady State Count, XML fields (e.g., XML Operation, XML Element Name, etc.), Published Output Location, Planned or Complete Dates, etc. If a matched document is missing on the source but present in the target content plan, it is given an action type "Remove".

At 915, the submission controller 1141 may store the comparison generated in 913 for the dispatch message record user interface 800 depicted in FIG. 8.

At 917, the submission controller 1141 may store the global and submission content plans to the submission library stored in the repository 111*a*. In one implementation, the submission library may be an active dossier whereby current submission content plans may be used for future global and submission content plans.

At 919, the submission controller 1141 may send a notification to user on the user interface the comparison is ready for review. The dispatch process above is run asynchronously by the submission controller 1141. In one implementation, when the comparison between global and submission content plans is completed, a "Review Comparison" button 602 will appear in the content plan user interface 600. Before the comparison is completed, 602 may be unavailable, hidden or greyed out.

At 921, the submission controller 1141 generates a comparison viewer user interface 700 as depicted in FIG. 7 and displays the generated comparison in 913. The submission controller 1141 generates a side by side hierarchical comparison of source with target content plan where each row is a content plan, content plan item, or matched document with an action type indicating the comparison. Confirmation is received by the submission controller 1141 of the desired changes to the submission content plan.

At 923, after receiving confirmation, the submission controller 1141 executes the changes and saves the documents to the repository 111*a*.

At 925, the submission controller 1141 performs a second validation. The submission controller 1141 may validate permissions and data model. In one implementation, dispatch may require atomic security access (e.g., either lifecycle or permission set for the configured user action). Similarly, the user may require the same permissions as copy content plan from submission. If any permissions are missing, the user may encounter a validation error for that target submission content plan.

In one implementation, a user can only dispatch the global content plan to submissions of activities where the user has at least read access to the submission grouping and the submission. For example, if the user cannot view any activities from the submission grouping A, submission grouping a is not available for selection in the dispatch global content plan dialog to dispatch to, and if select all is selected on the dispatch global content plan dialog, the dispatch job will not dispatch/copy to any submissions whose activity has a submission grouping A.

At 927, the submission controller 1141 finalizes, publishes and submits the submission content plan to the health authority.

At 929, the submission controller 1141 may store the global and submission content plans to the submission library stored in the repository 111*a*. In one implementation, the submission library may be an active dossier whereby current submission content plans may be used for future global and submission content plans.

The process ends at 931.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly per form their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored. The computer readable media does not include carrier waves and electronic signals passing wirelessly or over wired connections.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for processing global regulatory submissions in a content management system, wherein the content management system comprises a content management server comprising a submission controller stored in memory and executable by a processor, and a plurality of repositories, the computer-implemented method comprising:

creating, by the submission controller, a first content plan for regulatory submission for a regulatory event, wherein the first content plan includes a first and second submission document required for regulatory approval;

asynchronously dispatching, by the submission controller, at least the first submission document to a first affiliate for completion for regulatory submission;

asynchronously dispatching, by the submission controller, at least the second submission document to a second affiliate for completion for regulatory submission;

creating, by the submission controller, a second content plan for regulatory submission, wherein the second content plan includes the dispatched at least first submission document required for regulatory approval;

creating, by the submission controller, a third content plan for regulatory submission, wherein the third content plan includes the dispatched at least second submission document required for regulatory approval;

collating, by the submission controller using a translation layer that maps content plan items between different content plan templates, the first content plan and the second content plan to generate a comparison between each corresponding content plan item in the first and second content plan;

generating, by the submission controller, a comparison viewer user interface displaying a hierarchical representation of the comparison between the first content plan and the second content plan, wherein new, updated and removed documents are visually differentiated using color coding or shading to designate the correlation between the first content plan and the second content plan;

receiving input from the comparison viewer user interface confirming approval of selected content plan items in the second content plan; and storing, by the submission controller, each of the selected content plan items in the second content plan in a submission repository in the content management system wherein the submission controller continuously monitors documents in the content storage system for any changes that might affect publishing, and wherein the changes are updated in real-time, eliminating the possibility of human error and ensuring faster time to submission.

2. The computer-implemented method of claim 1 above, wherein the first content plan for regulatory submission is a global content plan.

3. The computer-implemented method of claim 1 above, wherein the second content plan for regulatory submission is a submission content plan for a regional or local submission.

4. The computer-implemented method of claim 1 above, wherein the third content plan for regulatory submission is a submission content plan for a regional or local submission.

5. The computer-implemented method of claim 1 above, wherein the asynchronously dispatching of at least the first submission document to the first affiliate for completion for regulatory submission includes dispatching one component of the first submission document to the first affiliate for completion for regulatory submission.

6. The computer-implemented method of claim 1 above, wherein the asynchronously dispatching of at least the second submission document to the second affiliate for completion for regulatory submission includes dispatching one component of the second submission document to the second affiliate for completion for regulatory submission.

7. The computer-implemented method of claim 1 above, further comprising publishing the second content plan to an archive in the content management system; and validating the second content plan against a first validation criterion, wherein the first validation criterion is based on a regulatory requirement.

8. The computer-implemented method of claim 7 above, further comprising publishing the third content plan to an archive in the content management system; and validating the third content plan against a first validation criterion, wherein the first validation criterion is based on a regulatory requirement.

9. The computer-implemented method of claim 1 above, further comprising publishing the third content plan to an archive in the content management system; and validating the third content plan against a second validation criterion, wherein the second validation criterion is based on a regulatory requirement.

10. The computer-implemented method of claim 1, further comprising uploading the second content plan from the content management system to an electronic gateway over a network in response to a user input.

11. The computer-implemented method of claim 10 above, further comprising uploading the third content plan from the content management system to an electronic gateway over a network in response to a user input.

12. The computer-implemented method of claim 1 above, wherein the regulatory event comprises introduction of a new product.

13. The computer-implemented method of claim 1 above, wherein the regulatory event comprises a change to an existing product.

14. The computer-implemented method of claim 1 above, wherein the creation of the second content plan is based on a content plan template that takes into account submission information.

15. The computer-implemented method of claim 14 above, wherein the submission information includes at least one selected from: country, region, submission type, involved product, and regional requirements.

16. The computer-implemented method of claim 14 above, wherein the content plan template is an electronic common technical document ("eCTD").

17. The computer-implemented method of claim 14 above, wherein the content plan template consists of one selected from the following: an electronic common technical document, a country specific submission template, or a country specific investigational template.

18. The computer-implemented method of claim 1 above, further comprising: collating the first content plan and the third content plan to generate a comparison between each corresponding content plan item in the first and third content plan.

19. The computer-implemented method of claim 1 above, further comprising: collating the first content plan and the third content plan to asynchronously generate a comparison between each corresponding content plan item in the first and third content plan.

* * * * *